Patented June 1, 1948

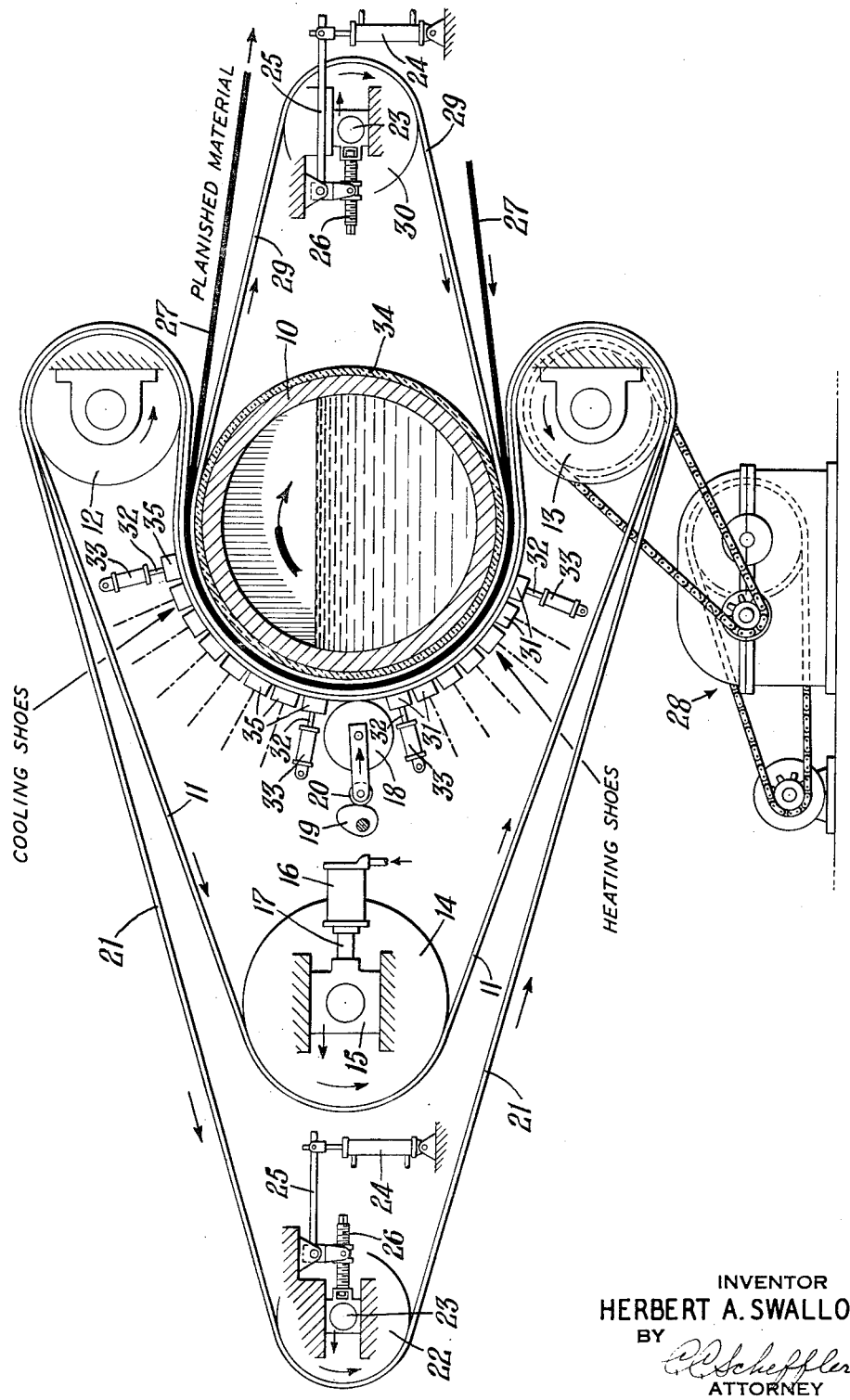

2,442,443

UNITED STATES PATENT OFFICE 2,442,443

APPARATUS FOR PRESSING PLASTIC SHEETING

Herbert A. Swallow, Plainfield, N. J., assignor to Bakelite Corporation, a corporation of New Jersey Application December 9, 1944, Serial No. 567,459

4 Claims. (Cl. 18—6)

This invention relates to an apparatus for planishing, laminating or embossing thermoplastic sheeting.

Heretofore, planishing, laminating or embossing operations with thermoplastic sheeting usually have been carried out in multiple platen steam-heated presses. In the customary method of operating these presses, the thermoplastic sheeting is cut into shape and the pieces are assembled by hand in alternation between heavy chromium-plated planishing plates, which have the desired polished or decorated surfaces. A number of such assemblies are usually placed in each opening of the press. The platens of the press are then closed and heated, and much time is consumed before the center assembly has reached the desired molding temperature because the layers of thermoplastic material have low heat conductivity. Where strains present in the thermoplastic sheeting are to be relieved, such strains being found in calendered sheeting composed of a copolymer of vinyl chloride and vinyl acetate, pressures of 250 to 400 pounds per square inch are maintained for about 15 minutes, after the calendered sheeting has reached a temperature of 120° to 150° C. Then the platens must be cooled before the assemblies are removed and the plastic sheeting separated from the planishing plates.

It is apparent that this process is time consuming because of the masses of material to be heated and cooled, the entire operation usually occupying about one hour. In fact, in commercial practice, it is necessary alternately to heat and cool about 125 pounds of metal for each pound of plastic material to be planished. Also, the labor involved in charging and operating the presses is considerable. In addition, the planishing plates are often difficult to separate from the plastic sheeting, especially if the plastic has flowed around the edges of the plate in the pressing operation. In forcing the planishing plates apart they are often damaged. Finally, the work involves a certain amount of hazard incident to the closing of the presses and handling the heavy assemblies. However, despite the known deficiencies of the known planishing presses, no satisfactory continuous process for planishing plastic sheeting has yet been developed. The widely employed calendering operations are, of course, continuous, but highly polished surfaces cannot be imparted by calender rolls, and the sheets produced contain objectionable strains.

In brief, my process involves passing the thermoplastic sheeting under pressure around part of the periphery of a revolving drum, heating the sheeting through heating means located on the exterior of the drum during the initial part of the passage around the drum, and cooling the sheeting through cooling means located on the exterior of the drum during the last part of its passage around the drum. Pressure is applied to the plastic sheeting by means of an endless tension belt, and the surface of the plastic is modified by means of one or two endless planishing or embossing belts, as illustrated in the drawing, and hereinafter more fully described.

It will be seen that my process involves no alternate heating and cooling of large metal masses, as in the conventional multiple-platen planishing presses, in that the heating means need not be cooled, and the cooling means need not be heated, at different stages of the process. The endless belts have a small heat capacity, and are readily heated and cooled. The amount of metal which is heated and cooled according to the present process is about one-fifth the quantity involved in the operation of multiple-platen presses.

During operation, the drum may be kept at an elevated, approximately constant temperature by suitable means, for instance, by circulating hot water through the interior of the drum. By this means, the plastic sheeting is more rapidly brought to the molding temperature during the heating cycle. Heat flow to and from the drum may be minimized by providing a layer of insulating material on the drum, such as tightly wound cloth padding. However, it is not essential that the drum be heated.

The minimum temperature to which the plastic sheeting must be cooled is dependent on the physical characteristics of the thermoplastic material being treated. All thermoplastic materials become softer and less cohesive when heated and their tackiness in relation to metal surfaces increases. The surface of the belts at the point at which the plastic sheet is separated therefrom must be below the temperature at which the thermoplastic sheeting adheres to the belts sufficiently to mar the finish of the plastic sheeting in removing it from the machine. Below this temperature, the sheeting only superficially adheres to metal. This temperature varies for different thermoplastic materials. It can be determined readily for any given material, however, by pressing polished sheets of the material against a metal surface, heated at successively higher temperatures, and noting the maximum temperature at which the sheets can be stripped from the heated surface without marring their finish. This maximum temperature has been determined at about 80° C. (176° F.) for a composition comprising a copolymer of vinyl chloride and vinyl acetate, containing from 80 to 97% vinyl chloride, and from 0 to 50% by weight of the composition of an ester plasticizer, such as di(2-ethylhexyl) phthalate, tricresyl phosphate, tri(2-ethylhexyl) phosphate, triethylene glycol di(2-ethylhexoate) and the like.

A suitable apparatus for carrying out my process is illustrated by the partly diagrammatic cross-sectional view shown.

With reference to the drawing, the old features of the apparatus to which I have added improvements adapting the machine for the continuous planishing of thermoplastic materials consist of the large revolving drum 10, the tension band 11, the guide rolls 12 and 13, and the roll 14, which is journaled in movable bearings 15. The roll 14 is moved by means of hydraulic cylinder 16 and piston 17 so that tension may be applied on the belt 11, causing it to press a planishing belt 21 tightly against the drum when in operative position. The pressure thus applied against the drum may reach 65 p. s. i. or higher. Additional pressure may be applied at selected areas of the drum where the thermoplastic sheeting has reached its molding temperature. Such additional pressure may be exerted by means of an auxiliary pressure roll 18 pushing the tension belt 11 and the planishing belt 21 more tightly against the drum. The force exerted by the pressure roll is regulated by the cam 19 acting through the cam follower 20. The additional pressure serves to level out any uneven spots in the sheeting.

In addition to the tension belt, the planishing belt 21 having a polished surface passes over the guide rolls 12 and 13, and around the drum in contact with the concave side of the tension belt. The planishing belt passes around roller 22, which is mounted in movable bearings 23. The planishing belt is kept taut by the pressure applied in cylinder 24 acting through arm 25 and adjusting rod 26. The planishing belt is constructed of stainless steel, chromium plated steel or other suitable metal, and, in normal operation, the tension placed on such belt is sufficient only to keep the belt taut and tracking properly on the guides. It normally is not employed as an auxiliary tension belt, because of the danger of breaking the belt, which is expensive and difficult to replace.

The machine is driven by a suitable mechanism, shown in its entirety at 28.

In operation, the plastic sheeting 27 is continuously fed to the machine so that is passes between the planishing belt 21 and the drum in such manner that the plastic sheeting coincides angularly with the planishing belt 21 and tangentially with the drum. This method of feeding as shown in the drawing prevents buckling, wrinkling and slipping of the plastic sheeting as it enters the machine and facilitates uniform and even tracking of the various plies against the drum surface. Similarly when the plastic sheeting after the completion of the heat pressing operation emerges from the machine, it is also coincidentally removed from the planishing belt surface and the drum surface. The simultaneous release of the sheeting from both surfaces eliminates slippage effects which are likely to cause marring or scuffing of the planished surface on the sheeting. The tension belt holds the planishing belt tightly against the plastic sheet throughout its passage around the drum. By reason of the heating and cooling cycle performed, the surface of the planishing belt is faithfully reproduced on the thermoplastic sheeting when it leaves the planishing machine to be wound on a suitable take-up mechanism. If the thermoplastic sheet is to be laminated to cloth or other backing material, the assembly of thermoplastic sheet and backing material is passed around the supporting drum with the plastic side of the assembly in contact with the planishing belt, and the cloth side against the padding on the drum.

In order to provide a continuous method for imparting a smooth and glossy surface on each side of the thermoplastic sheeting, thus duplicating at increased speed and reduced costs the effects obtainable with a multiple platen discontinuous press, I provide a second planishing belt 29 aligned on the supporting drum 10 and the guide roll 30, as shown in the drawing. It will be seen from this drawing that the thermoplastic sheeting is fed between the two planishing belts and is nipped at the vertex of the angle created by the planishing belts converging at a point tangential to the drum surface. Similarly upon completion of the planishing operation the plastic sheeting is released simultaneously from both belt surfaces at the vertex of the angle formed by the divergent direction taken by each planishing belt as it tangentially separates from the drum surface. The guide roll 30 is supported in the same manner as the guide roll 22, previously described.

The thermoplastic sheet is brought to a molding and strain-relieving temperature during its passage around approximately one-quarter of the circumference of the drum. This may be accomplished by installing a series of heating shoes 31 having arcuate surfaces in contact with the outermost belt on the drum. The shoes may be heated electrically or by a circulating fluid. The shoes are held against the drum in such a manner that they will move in response to a change in thickness of the material fed to the machine. Controlled resistance to such movement may be accomplished by pressing each shoe against the outer belt by means of one of the pistons 32 supported in a fluid operated cylinder 33. The temperature of the heating shoes may be approximately 290° to 455° C., more or less, and, because of the small mass of material being heated and the short path for the heat to travel, the plastic material rapidly reaches its molding and strain-relieving temperature. This temperature varies for different materials, but it is usually from 120° to 190° C.

The drum can carry a suitable layer of heat insulating material 34, such as cloth padding wound on the drum.

During its passage over the next quadrant of the drum, and while still held under pressure by the tension band, the thermoplastic sheeting is cooled by means of cooling shoes 35, which are held against the drum in a similar manner as the heating shoes. The thermoplastic sheeting is then cooled to a temperature at which it may be separated from the belts without impairing its finish.

It will be seen that the invention thus provides an apparatus for planishing thermoplastic material. Because the heat capacity of the belts and thermoplastic sheeting is not large, the rate at which sheeting may be planished is dependent only on the rate of heat transfer between the heating and cooling surfaces. The productive capacity of the machine is increased, the larger the diameter of drum employed, within practical limits of course. A drum having a diameter of about six feet is quite suited for commercial operations.

Using an experimental machine having a supporting drum with a diameter of 1 foot, and a length of 1 foot, a number of sheets composed of plasticized and unplasticized copolymers of vinyl chloride and vinyl acetate were passed through the machine at linear speeds such that the molding cycle including heating and cooling occupied from about 1 to 2 minutes depending on the material treated. The molding pressure exerted by the tension band on the supporting drum was varied from 17 to 65 pounds per square inch. The drum temperature was maintained at about 80° C., and the heating shoe temperatures varied from 330° to 455° C. Sheeting having a polished surface on one or both sides was steadily obtained on this machine under these conditions, and the sheeting was free from defects when simultaneously removed from both planishing belts as shown in the drawing. By way of example only, the sheeting thickness may vary from 0.001 to 0.125 of an inch.

Two or more thermoplastic sheets may be laminated on the machine, or the thermoplastic sheet may be laminated to cloth. Waterproof cloth may be made on the machine by feeding two layers of cloth with an intermediate layer of thermoplastic sheeting, or two layers of thermoplastic sheeting having an intermediate layer of a suitable textile fabric. Decorated thermoplastic sheeting may be obtained by feeding colored or decorated strips of plastic material in contact with the sheeting. These strips become an integral part of the finished article, being inlaid therein. Plasticized sheeting containing from 30 to 50% plasticizer may be covered with a clear, cast film containing from 0 to 35% plasticizer. When the base layer contains pigments, the finished product has a brilliant surface, which is harder and which shows less tendency to adhere to itself or other surfaces.

When the sheeting of plasticized vinyl chloride-vinyl acetate copolymer contains a small amount of carbon black, a product surpassing patent leather in the depth and brilliance of its finish may be produced on the machine. Wear tests on such products show that they have much better resistance to cracking than patent leather.

It is apparent that sheeting composed of any of the thermoplastic materials may be planished on the machine, such as plasticized polyvinyl chloride, cellulose acetate, cellulose nitrate, cellulose aceto-butyrate, polymethylmethacrylate, polyvinylidene chloride, polystyrene and the like Calendered sheeting composed of plasticized vinyl chloride-vinyl acetate copolymer having internal strains imposed by the calendering process was almost entirely freed of such strains by the continuous planishing process, as shown by the fact that the planished sheeting was dimensionally stable when later heated at a temperature of 150° C.

Modifications of the invention will be apparent to those skilled in the art, and are included within the scope of the invention as defined in the appended claims.

I claim:

1. Machine for planishing thermoplastic material comprising a revolvable drum, two continuous planishing belts fitted over an arcuate portion of the drum, such belts passing over pulleys located at opposite ends of the machine and approaching the drum at an acute angle permitting insertion of thermoplastic sheeting between the belts, an endless tension band passing over said arcuate portion on the exterior of said belts so as to apply pressure on the belts, means for heating the exterior of the tension band during the first part of its passage around said arcuate portion of the drum, and means for cooling the exterior of the tension band during the final part of its passage around said arcuate portion of the drum.

2. Machine for planishing thermoplastic material comprising a revolvable drum, two continuous planishing belts fitted over an arcuate portion of the drum, such belts passing over pulleys located at opposite ends of the machine and approaching the drum at an acute angle permitting insertion of thermoplastic sheeting between the belts, an endless tension band passing over said arcuate portion on the exterior of said belts so as to apply pressure on the belts, and non-intermingled heating and cooling shoes held in contact with the tension band on said arcuate portion of the drum by means of fluid-operated cylinders.

3. Machine for planishing thermoplastic material comprising a rotating drum having around its periphery a layer of heat insulating material, two continuous planishing belts fitted over an arcuate portion of the insulated drum surface and passing over pulleys mounted with relation to the drum to cause the belts to approach and depart from the drum at acute angles with respect to each other to respectively permit the insertion of the thermoplastic sheeting between the belts and the stripping of the thermoplastic sheeting from the belts upon completion of the planishing operation, an endless tension band passing over the said arcuate portion of the drum exteriorly of said belts so as to press the belts against the drum, heating shoes mounted for contact with the tension band for a part of the arcuate portion of the drum proximate to the entry of the thermoplastic sheeting between the belts, cooling shoes mounted for contact with the tension band on the arcuate portion of the drum proximate to the exit of the thermoplastic sheeting from the belts, said heating and cooling shoes being held in contact with the tension band by yieldable pressure means responding to changes in thickness of the thermoplastic sheeting.

4. Machine for planishing thermoplastic material comprising a rotating drum having around its periphery a layer of heat insulating material, said drum having an interior chamber for containing a heat-transfer fluid, two continuous planishing belts fitted over an arcuate portion of the insulated drum surface and passing over pulleys mounted with relation to the drum to cause the belts to approach and depart from the drum at acute angles with respect to each other to respectively permit the insertion of the thermoplastic sheeting between the belts and the stripping of the thermoplastic sheeting from the belts upon completion of the planishing operation, an endless tension band passing over the said arcuate portion of the drum exteriorly of said belts so as to press the belts against the drum, heating shoes mounted for contact with the tension band for a part of the arcuate portion of the drum proximate to the entry of the thermoplastic sheeting between the belts, cooling shoes mounted for contact with the tension band on the arcuate portion of the drum proximate to the exit of the thermoplastic sheeting from the belt, said heating and cooling shoes being held in contact with the tension band by yieldable pressure means responding to changes in thickness of the thermoplastic sheeting.

HERBERT A. SWALLOW.

REFERENCES CITED

The following references are of record in the file of this patent:

UNITED STATES PATENTS

| Number | Name | Date |
|---|---|---|
| 986,162 | Gare | Mar. 7, 1911 |
| 1,060,122 | Prosig | Apr. 29, 1913 |
| 2,069,589 | Meijling et al. | Feb. 2, 1937 |
| 2,109,190 | Coffey | Feb. 22, 1938 |
| 2,182,168 | Bierer | Dec. 5, 1939 |
| 2,218,227 | Winnek | Oct. 15, 1940 |
| 2,350,632 | Murphy et al. | June 6, 1944 |